(12) United States Patent
Klein et al.

(10) Patent No.: US 6,342,465 B1
(45) Date of Patent: Jan. 29, 2002

(54) PROCESS FOR PREPARING A CATALYST

(75) Inventors: Harald Klein, Bessenbach; Jürgen Leyrer, Rheinfelden; Rainer Domesle, Alzenau; Egbert Lox, Hanau; Thomas Kreuzer, Karben, all of (DE)

(73) Assignee: DMC2 Degussa Metals, Frankfurt am Main (DE)

( * ) Notice: Subject to any disclaimer, the term of this patent is extended or adjusted under 35 U.S.C. 154(b) by 0 days.

(21) Appl. No.: 09/205,280

(22) Filed: Dec. 4, 1998

(30) Foreign Application Priority Data

Dec. 4, 1997 (DE) .......................... 197 53 738

(51) Int. Cl.$^7$ .................. B01J 23/42; B01J 23/44; B01J 23/00
(52) U.S. Cl. .................. 502/339; 502/325; 502/334
(58) Field of Search ................ 502/325, 339, 502/334

(56) References Cited

U.S. PATENT DOCUMENTS

| | | | | |
|---|---|---|---|---|
| 4,450,244 A | * | 5/1984 | Domesle et al. | 502/185 |
| 4,650,782 A | | 3/1987 | Onal | 502/339 |
| 5,073,532 A | * | 12/1991 | Domesle et al. | 502/304 |
| 5,202,299 A | | 4/1993 | Symons et al. | 502/242 |
| 5,272,125 A | | 12/1993 | Weible et al. | 502/242 |
| 5,446,006 A | * | 8/1995 | Domesle et al. | 502/439 |
| 5,496,788 A | * | 3/1996 | Domesle et al. | 502/333 |
| 5,753,581 A | | 5/1998 | Backmeyer et al. | 502/304 |
| 5,928,981 A | * | 7/1999 | Leyrer et al. | 502/64 |
| 5,958,829 A | * | 9/1999 | Domesle et al. | 502/333 |

FOREIGN PATENT DOCUMENTS

| | | |
|---|---|---|
| DE | 2325725 | 12/1973 |
| DE | 2818824 | 11/1978 |
| DE | 4239876 | 7/1994 |
| EP | 0596552 | 5/1994 |
| EP | 0714692 | 6/1996 |

OTHER PUBLICATIONS

Acidic and Basic Properties of Aluminas in Relation to Their Properties as Catalyst and Supports, H. Knözinger, Studies in Surface Science and Catalysis, 1985, pp. 111–125, 1985, XP002095655. Month not available.

* cited by examiner

*Primary Examiner*—Mark Bell
*Assistant Examiner*—Patricia L. Hailey
(74) *Attorney, Agent, or Firm*—Smith, Gambrell & Russell LLP

(57) ABSTRACT

A process for preparing a catalyst which has a catalytically active coating of high surface area finely divided materials and catalytically active components on an inert carrier structure. A powder mixture of the finely divided materials used is impregnated with a solution of precursor compounds of the catalytically active components. By suitable combination of the finely divided materials and the precursor compounds and appropriate management of the impregnation process, a highly dispersed deposition and adsorption of the catalytically active components is ensured on the finely divided materials. Then ai aqueous coating dispersion is produced using the impregnated powder mixture and the carrier structure is coated therewith. The coating is then dried and calcined.

13 Claims, No Drawings

PROCESS FOR PREPARING A CATALYST

INTRODUCTION AND BACKGROUND

The present invention relates to a process for preparing a catalyst which has a catalytically active coating consisting of high surface area, finely divided materials and catalytically active components on an inert carrier structure, by applying the catalytically active components to the finely divided materials, producing a coating dispersion from these materials and coating the carrier structure therewith.

This type of process provides catalysts which are used in many areas of chemical engineering. They are so-called supported catalysts in which the catalytically active components, in highly dispersed form, are applied to support materials in order to ensure high catalytic activity of the catalyst with the smallest possible amount of active components. For this purpose, support materials which have a large specific surface area for taking up the catalytically active components are used. They are generally finely divided, that is powdered, thermally stable metal oxides.

In the case of automotive vehicle exhaust catalysts, the support materials are applied in the form of a coating on catalytically inert carrier structures. Carrier structures which are suitable for automotive exhaust gas treatment are so-called honeycomb structures made of ceramic or metal which have parallel flow channels through which the exhaust gas can pass. In order to coat the honeycomb structure with the support materials, the support materials are generally dispersed in water and usually homogenized by means of a milling process. Milling adjusts the average particle size of the support materials to a value between 1 and 10 $\mu$m.

The walls of the flow channels are coated by immersing the honeycomb structure, once or several times, in this coating dispersion, followed by drying and calcining. The final coating is also called a dispersion coating.

During this procedure the catalytically active components may be applied to the specific surface area of the support materials at different times. For example, it is known that the catalytically active components are deposited only after coating the honeycomb structure with the dispersion coating by immersing the coated honeycomb structure in an aqueous solution of soluble precursors of the catalytically active components. Alternatively, there is the possibility of applying the catalytically active components to the powdered support materials in a stage which precedes producing the dispersion coating.

The present invention relates to this second possibility of depositing the catalytically active components. In order to achieve a high catalytic activity, the type of deposition must ensure that the components are deposited in as finely divided a manner as possible on the specific surface area of the support materials. In addition the type of deposition should also lead to high thermal and ageing stability of the final catalyst, that is to say the particles of catalytically active components must be firmly fixed to the surface area of the support materials in order to prevent neighboring particles agglomerating when the catalyst is subjected to high temperatures.

A variety of processes have been disclosed for depositing catalytically active components onto powdered support materials. These include, for example, impregnation with an excess of impregnating solution. In that process, an aqueous solution of the catalytically active components is added to the powdered support material, wherein the volume of the solution may be much greater than the water absorption capacity of the support material. This results in a material with a pasty consistency which is dewatered, for example in an oven at elevated temperatures of 80–150° C., and is then calcined at still higher temperatures to fix the catalytically active components. During the dewatering procedure, chromatographic effects may take place which could lead to uneven distribution of the catalytically active components on the support material.

During so-called pore volume impregnation, an amount of solvent is used to make up the solution of catalytically active components which corresponds to about 70–100% of the absorption capacity of the support material for this solvent. The solvent is generally water. This solution is distributed as uniformly as possible, for example by spraying over the support material while it is rotated in a vessel. After distributing the entire amount of solution over the support material the material is still free-flowing despite the presence of water. Finally the impregnated material is dried and then calcined at elevated temperatures to fix the catalytically active components on the support material. Chromatographic effects can largely be avoided when using pore volume impregnation. It generally provides better results than the process described above for impregnation with an excess of solvent.

The disadvantage of these known processes for impregnating support materials with catalytically active components is the fact that the catalytically active components have to be fixed to the support material by drying and calcining after the impregnation process, with the consumption of large amounts of energy, in order to prevent these components being desorbed from the support material during redispersion of the support material, which is required when producing the coating dispersion.

An object of the present invention is to achieve highly dispersed distribution of the catalytically active components on the support materials and largely avoid costly drying and calcining steps. Highly dispersed catalytically active components are considered to be those with crystallite sizes of less than 10 nm, preferably between 2 and 7 nm.

SUMMARY OF THE INVENTION

The above and other objects are achieved according to the invention by a process for preparing a catalyst which has a catalytically active coating consisting of high surface area, finely divided materials and catalytically active components on an inert carrier, by applying the catalytically active components to the finely divided materials, producing a coating dispersion from these-materials and coating the carrier structure therewith.

A feature of the present invention is a process that comprises the following process steps:

(a) impregnating a powder mixture of the designated finely divided materials with a solution of precursor compounds of the catalytically active components by the pore volume impregnation process, wherein the precursor compounds are adsorbed on at least one of the materials, (b) producing an aqueous coating dispersion by using the impregnated powder mixture, (c) coating the carrier structure with the dispersion obtained in this way and (d) drying and calcining the coating on the inert carrier.

Materials with a high surface area within the context of this invention are understood to be those with specific surface areas (measured according to DIN 66132) of more than 10 m²/g. For treating automotive exhausts, noble metals from the platinum group of the Periodic Table of Elements are preferably used as catalytically active components. These include ruthenium, rhodium, palladium, osmium, iridium and platinum, as well as mixtures thereof.

Adsorption of the precursor compounds on the support materials depends both on the surface properties of the support materials and also on the precursor compounds and the pH of the impregnating solution. It is known, for example, that nitrates of the platinum group metals are adsorbed very strongly on aluminum oxide, but that chlorides are only weakly adsorbed at the same acidity of the impregnating solution. This difference is used during the preparation of pellet catalysts in order to have an effect on the distribution of catalytically active elements in the pellets. When using nitrates, for example, a specific outer shell profile is obtained, whereas the use of chlorides leads to almost uniform penetration of the entire pellet with the active components.

It has been shown that neither very strong nor weak adsorption leads to optimum dispersion of the catalytically active noble metals on powdered materials. In the case of very strong adsorption, the powder particles in the support materials are only inadequately penetrated by the precursor compounds. The precursor compounds are deposited only on the outer parts of the specific surface area of the powder particles. The high concentration which results in these areas leads to coarsening of the crystallite sizes of the catalytically active noble metals. In the case of weak adsorption of the precursor compounds, however, these remain mobile for a long time. When drying the impregnated support materials chromatographic effects may then take place, resulting in very uneven distribution of the catalytically active noble metals on different fractions of the impregnated material. The crystallite sizes of the noble metals then have a very wide range. In addition to very small crystallites there is also a considerable proportion of noble metals with crystallite sizes greater than 10 nm.

DETAILED DESCRIPTION OF INVENTION

It has now been found that uniform and highly dispersed deposition of the noble metals is possible with a suitable combination of support materials and precursor compounds for the noble metals. This is the case, for example, when at least one of the finely divided materials has an iso-electric point between 6 and 10 and when anionic salts of the platinum group metals are used as precursor compounds. This combination of properties leads to uniform penetration of the powdered particles of the particular material and good adsorption. Adsorption in this case is substantially due to an electrostatic interaction between the positive surface charges on the support material and the negatively charged anions.

After impregnation the precursor compounds are thermally fixed on the support materials. For this, the impregnated powdered material is first dried at temperatures of up to 180° C. and then calcined at temperatures higher than 300° C. The precursor compounds decompose during calcination. Depending on the temperature chosen and type of precursor compound, a mixture of different oxidation states of the noble metals are formed which no longer go into solution during the subsequent process for producing the aqueous coating dispersion.

In a particularly advantageous variant of the process according to the invention, the precursor compounds are not thermally fixed. Rather, the still moist, powdered material from the impregnation process is processed directly to give an aqueous coating dispersion. By adjusting the pH of this dispersion to a value which is 1 to 3 units below the iso-electric point mentioned above, preferably between 4 and 8, the precursor compounds are prevented from going back into solution. Considerable energy savings for thermal fixing of the precursor compounds can be achieved by this method of working and the entire production process for the catalyst becomes very efficient.

To perform pore volume impregnation, the mixture of support materials chosen is uniformly rotated, for example, in a vessel while the solution of precursor compounds is sprayed over the powdered material using a nozzle. The volume of solvent used according to the invention is restricted to a maximum of 90% of the absorption capacity of the powder mixture. The small amount of solvent used prevents the precursor compounds desorbing once they have been adsorbed and thus prevents them agglomerating into larger crystallites. The smaller the volume of solvent chosen, the more reliably is unwanted desorption prevented. The volume of solvent is restricted at the lower end, however, by the requirement that the amount of precursor compounds required to load the support material to the amount desired has to dissolve in the volume which is used. This can lead to different lower limits for the volume of solvent, depending on the solubility of the precursor compounds. Solvent volumes of less than 40% cannot generally be used. Solvent volumes between 50 and 70% of the absorption capacity of the powder mixture are particularly advantageous for the process according to the invention.

If the use of a solvent volume of 90% of the water absorption capacity, due to the low solubility of the precursor compounds, does not apply the required amount of catalytically active component to the support materials in one impregnation process, then impregnation may be repeated several times with a smaller amount of solvent and appropriate intermediate drying processes.

The impregnation process must ensure, despite the low solvent volumes, that all parts of the powder mixture come into uniform contact with the impregnating solution. For this purpose, the powdered material is rotated in a vessel and the impregnating solution is sprayed over the surface of the powdered material at a constant volume flow. Volume flows of 50 ml of solution per kilogram of powdered material per minute (50 ml/(kg.min)) have proven suitable. With flows of more than 200 ml/(kg.min), the powdered material is no longer sufficiently uniformly impregnated. Below 5 ml/(kg.min), the long impregnation times are not economically viable.

The powdered material impregnated in this way is still free-flowing which greatly facilitates further processing. It is dispersed in water and optionally organic additives, either after thermal fixing or directly without further thermal treatment, in order to produce the coating dispersion for the inert carrier structures. After coating the carrier structure with the dispersion obtained in this way, the coating is dried at elevated temperatures from 80 to about 180° C. and then calcined at temperatures of more than 300° C.

Suitable support materials with an iso-electric point between 6 and 10 are, for example, aluminum oxide, cerium oxide, zirconium oxide, titanium oxide, silicon dioxide or mixed oxides thereof. Anionic noble metal salts which are suitable for the purpose are, for example, methylethanolamineplatinum(IV) hexahydroxide, ethanolamineplatinum(IV) hexahydroxide and hexachloroplatinic(IV) acid or mixtures thereof. Anionic salts of platinum group metals which are complexed with methanolamine or ethanolamine are particularly preferred.

To obtain the desired catalytic effect for a final catalyst it is frequently necessary that specific catalytically active components are deposited only on specific support materials, in order to avoid harmful interactions between catalytically active components and support materials. In a case like this, the different support materials in a catalyst must be impregnated separately with the relevant noble metals. Only then is a common coating dispersion produced from these materials. Thus it is known, for example, that care must be taken during the preparation of diesel catalysts, when using zeolites, that the zeolites are not coated with platinum group metals because this can lead to coking at the zeolite surface. Therefore the other support materials in the diesel catalyst have hitherto been impregnated separately with the platinum group metals before they are combined with the zeolite fractions to produce a common coating dispersion. Surprisingly, it has been shown that this type of separation is not required in the process according to the invention because the anionic noble metal salts are adsorbed to only a very small extent by zeolites.

It was found that the desired interaction between support material and noble metal salts may also be produced with support materials with an iso-electric point between 2 and 7 when cationic noble metal salts are used. In this variant of the process according to the invention thermal fixing may also take place or be omitted, as required. If thermal fixing is omitted, then the coating dispersion must be adjusted to a pH which is 1 to 5 units above the iso-electric point mentioned above, preferably between 7 and 9, in order to prevent desorption of the precursor compounds.

Various support materials and their iso-electric points are listed in Table 1, pH ranges are cited for the particular iso-electric points since the iso-electric point of a specific support oxide has different values depending on the method of preparation and thus the iso-electric points vary within a certain pH range. Thus titanium dioxide, which has been sulfatized, is more acid than pure titanium dioxide and therefore has a lower iso-electric point.

The iso-electric points in Table 1 were measured using the electrokinetic sonic amplitude process using the ESA 8000 instrument from the Matec Applied Sciences Company MA, USA. A description of the method of measurement may be found in the article by J. Winkler "Zeta potential of pigments and fillers" in EJC, Jan. 2, 1997, pages 38–42.

TABLE 1

Support materials

| Material | Iso-electric point [pH] |
|---|---|
| Aluminum oxide $Al_2O_3$ | 7.5–9.0 |
| Aluminum silicate $Al_2O_3xSiO_2$ (95% $Al_2O_3$, 5% $SiO_2$) | 7.0–8.5 |
| Silicon dioxide $SiO_2$ | 1.5–3.0 |
| Titanium dioxide $TiO_2$ | 5.5–7.5 |
| Zirconium oxide $ZrO_2$ | 6.0–7.5 |

Table 2 gives a few anionic and cationic platinum compounds which are suitable for the process when combined with the support materials in Table 1. The platinum complexes in Table 2 are given as examples of the analogous complexes for the other platinum group metals.

TABLE 2

Precursor compounds of platinum

| Anionic platinum complexes | Cationic platinum complexes |
|---|---|
| Methylethanolamineplatinum (IV) hexahydroxide $(MEA)_2Pt(OH)_6$ | Platinum nitrate |
| Ethanolamineplatinum (IV) hexahydroxide $(EA)_2Pt(OH)_6$ | Tetraammineplatinum (II) nitrate $[Pt(NH_3)_4](NO_3)_2$ |
| Hexachloroplatinic (IV) acid | Tetraammineplatinum (II) hydroxide |
| $H_2PtCl_6$ | $[Pt(NH_3)_4](OH)_2$ |

Some catalysts were prepared for use in the following examples by using the process according to the invention. For this, the following raw materials were used:

Aluminum silicate: with 5 wt. % of silicon dioxide stabilized aluminum oxide; specific surface area: 153 $m^2/g$.

Titanium dioxide: specific surface area: 95 $m^2/g$.

Zirconium dioxide: specific surface area: 96 $m^2/g$.

DAY: de-aluminized Y-zeolite with a molar ratio of silicon dioxide to aluminum oxide of about 200.

Methylethanolamineplatinum(IV) hydroxide

Ethanolamineplatinum(IV) hydroxide

Platinum nitrate

Hexachloroplatinic(IV) acid: $H_2PtCl_6$

Carrier structure: open-cell honeycomb structure of cordierite with a diameter of 2.5 cm and length of 7.6 cm; cell density: 62 $cm^{-2}$; thickness of walls between the flow channels: 0.2 mm

COMPARISON EXAMPLE 1

1 kg of a powder mixture of aluminum silicate and DAY zeolite in the ratio by weight of 84:16 were initially placed in a coating pan. The mixture had a water absorption capacity of 1220 ml/kg. It was sprayed with 833 ml, corresponding to 68.3% of the water absorption capacity of the powder mixture, of an aqueous solution of tetraammineplatinum(II) nitrate at a volume flow of 56 ml/(kg.min) with constant rotation. The powder which was still free-flowing was dried in an oven for a period of 12 hours at 150° C. and then calcined for a period of 4 hours at 300° C. in air to fix the platinum. The powder prepared in this way contained 0.95 wt. % of platinum, with respect to its total weight.

Examination of the powder with a transmission electron microscope showed an average crystallite size for the platinum of 10 nm. An aqueous coating dispersion was produced using this powder. The coating dispersion had a pH of 6. A first honeycomb structure was coated by immersion in this dispersion with 140 g of dry weight per liter of honeycomb structure volume. The coating was dried in air at 120° C. and calcined in air for 4 hours at 300° C.

COMPARISON EXAMPLE 2

Another kilogram of the powder mixture of aluminum silicate and DAY zeolite was impregnated in the same way as in comparison example 1. However, the impregnated powder was not thermally conditioned, but was further processed immediately to give an aqueous coating dispersion which also had a pH of 6. Analysis of the aqueous phase of the coating dispersion showed a high concentration of platinum.

A second honeycomb structure was coated by immersion in this dispersion. The dried and calcined honeycomb structure contained 140 g/l of support material and only 0.56 g/l of platinum.

EXAMPLE 1

Another kilogram of powder mixture of aluminum silicate and DAY zeolite was impregnated with platinum in the same way as described in comparison example 1. Instead of tetraammineplatinum(II) nitrate, however, an aqueous solution of monoethanolamineplatinum(IV) hydroxide was used for impregnation. As in comparison example 1, the powder which was still free-flowing was dried in an oven at 150° C. for 12 hours and then calcined in air for 4 hours at 300° C. to fix the platinum. The powder prepared in this way contained 0.95 wt. % of platinum, with respect to its total weight.

Testing the powder activated with platinum showed a very uniform distribution of platinum crystallites on the aluminum silicate. The average crystallite size was 5 nm. Although the zeolite had been impregnated at the same time as the aluminum silicate no platinum crystallites were found on the zeolite particles.

The powder activated with platinum was dispersed in water and homogenized by milling in a ball mill. The concentration of solids in the final coating dispersion was 35 wt. %. The pH of the coating dispersion was 6.5. Testing the aqueous phase of the coating dispersion showed no indication of dissolution of platinum constituents from the aluminum silicate.

A third honeycomb structure was coated by immersion in this dispersion with a 140 g of dry weight per liter of honeycomb structure volume. The coating was dried in air at 120° C. and calcined in air at 300° C. for 4 hours. The final catalyst contained 1.34 g of platinum per liter of catalyst volume.

EXAMPLE 2

A fourth honeycomb structure was coated with the coating dispersion from example 1. After calcining the coating, the catalyst was reduced in forming gas (95 vol. % $N_2$; 5 vol. % $H_2$) for a period of 2 hours. The catalyst contained the same amount of coating as in example 1.

EXAMPLE 3

Another kilogram of the aluminum silicate/DAY zeolite mixture was prepared and impregnated with platinum in the same type of way as described in example 1. However, the impregnated powder was not thermally treated, but processed immediately to give an aqueous coating dispersion. The dispersion had a pH of 6.5. Analysis of the aqueous phase of the coating dispersion showed no signs of dissolved platinum constituents (see example 8).

A fifth honeycomb structure was coated with this dispersion, dried, calcined and reduced. The amounts of coating were identical to those in example 1.

EXAMPLE 4

Another kilogram of the aluminum silicate/DAY zeolite mixture was prepared and impregnated with platinum in the same way as described in example 3. Ethanolamineplatinum (IV) hydroxide was used as platinum precursor substance. The impregnated powder was not treated thermally as described in example 3 but processed immediately to give an aqueous coating dispersion. The dispersion had a pH of 6.5. Analysis of the aqueous phase of the coating dispersion also showed no signs of dissolved platinum constituents.

A sixth honeycomb structure was coated with this dispersion, dried, calcined and reduced. The amounts of coating were identical to those in example 1.

EXAMPLE 5

Another kilogram of aluminum silicate/DAY zeolite mixture was prepared and impregnated with platinum in the same way as described in example 3. Platinum nitrate was used as the platinum precursor substance. The impregnated powder was not treated thermally as described in example 3 but processed immediately to give an aqueous coating dispersion. The dispersion was adjusted to a pH of 5.8 using nitric acid. Analysis of the aqueous phase of the coating dispersion also showed no signs of dissolved platinum constituents.

A seventh honeycomb structure was coated with this dispersion, dried, calcined and reduced. The amounts of coating were identical to those in example 1.

EXAMPLE 6

A kilogram of a titanium dioxide/DAY zeolite mixture was prepared and impregnated with platinum in the same way as described in example 3. The powder mixture had a water absorption capacity of 920 ml/kg. The volume of impregnating solution was 506 ml, that is 55 % of the water absorption capacity of the powder mixture. Methylethanolamine-platinum(IV) hydroxide was used as the platinum precursor substance. The impregnated powder was not treated thermally as described in example 3 but was processed immediately to give an aqueous coating dispersion. The dispersion was adjusted to a pH of 5.0 using nitric acid. Analysis of the aqueous phase of the coating dispersion also demonstrated no signs of dissolved platinum constituents.

EXAMPLE 7

One kilogram of a zirconium dioxide/DAY zeolite mixture was prepared and impregnated with platinum in the same way as described in example 3. The powder mixture had a water absorption capacity of 875 ml/kg. The volume of impregnating solution was 534 ml, that is 61% of the water absorption capacity of the powder mixture. Methylethanolamine-platinum(IV) hydroxide was used as the platinum precursor substance. The impregnated powder was not treated thermally as described in example 3 but processed immediately to give an aqueous coating dispersion. The dispersion was adjusted to a pH of 5.0 using nitric acid. Analysis of the aqueous phase in the coating dispersion also demonstrated no signs of dissolved platinum constituents.

As the previous examples and comparison examples demonstrate, only the correct combination of materials can ensure the deposited noble metal components adhering firmly to the support material without thermal fixing and thus not passing into the aqueous phase during production of the coating dispersion and leading to losses of noble metal.

EXAMPLE 8

The support oxides impregnated with platinum in accordance with examples 1 to 4 were used to prepare coating dispersions with different pH values (4, 7 and 10) in order to check for possible dissolution of platinum components from the support oxides by the aqueous phase of the coating dispersions. The platinum concentration in the aqueous phase was measured each time after 2 and 24 hours and also after 7 days. These periods of time are called dwell times in the following.

To perform the measurement, the particular coating dispersion was filtered and the aqueous phase analyzed for platinum using ICP-MS (ion coupled plasma—mass spectrometry).

The platinum concentration of the support oxide was calculated from the difference between the amount of platinum used and the amount of platinum found in solution. The results are given in Table 3.

The second column in Table 3 gives the concentration of platinum in the support oxides before producing the coating dispersion. In all cases this was 0.95 wt. %. Columns 5 to 7 contain the platinum concentrations in wt. %, with respect to the concentration of platinum in the particular support oxide, in the aqueous phase for different pH values and for the different dwell times. Columns 8 to 10 give the calculated platinum concentration remaining on the support oxide.

In examples 1 and 2, the platinum components were thermally fixed on to the support oxides. Within the accuracy of measurement, they demonstrate no platinum dissolution by the aqueous phase of the coating dispersion. In examples 3 and 4, the platinum components were not thermally fixed onto the support oxides. It can be seen from Table 3 that in these cases also, with correct selection of pH values for the coating dispersion (values less than 7) only negligible platinum dissolution was observed. If the pH was incorrectly adjusted (pH equal to 10) in the coating dispersion, however, very significant platinum dissolution of up to 30 wt. % took place.

TABLE 4

Test conditions and model gas composition for determining the rates of conversion of the pollutants CO, HC, $NO_x$, and $SO_2$ in a synthesis gas unit

| Component | Concentration |
|---|---|
| CO | 350 [vppm] |
| $H_2$ | 117 [vppm] |
| $C_{16}H_{34}$ | 90 [ppmC$_3$] |
| $SO_2$ | 20 [vppm] |
| NO | 270 [vppm] |
| $O_2$ | 6 [vol.-%] |
| $H_2O$ | 10 [vol.-%] |
| $CO_2$ | 10.7 [vol.-%] |
| $N_2$ | remainder |
| Amount of gas | 1950 [Nl/h] |
| Size of catalyst | Ø 25 mm × 76 mm |
| Space velocity | 50000 [h$^{-1}$] |
| Rate of heating | 15 [° C./min] |

The measuring equipment listed in Table 5 was used to measure gas components contained in the exhaust gas.

TABLE 5

Types of measuring equipment used to measure exhaust gas concentrations in the synthesis gas test unit

| Gas to be analyzed | Equipment | Manufacturer |
|---|---|---|
| $O_2$ | Oxymat | Siemens AG |
| Hydrocarbon | FID | Pierburg Meβtechnik |
| $NO_x$ | CLD 700 Elht | Zellweger ECO-Systeme |
| CO | Binos | Rosemount |
| $CO_2$ | Binos | Rosemount |
| $SO_2$ | Binos | Rosemount |

TABLE 3

Platinum concentration of the aqueous phases of the coating dispersions and of support oxides as a function of pH and of the dwell time in accordance with example 8.

| Example | Pt conc. in the support oxide [wt. %] | Pt complex | Dwell time | Pt in solution [wt. %] pH 4 | pH 7 | pH 10 | Pt on the solid [wt. %] pH 4 | pH 7 | pH 10 |
|---|---|---|---|---|---|---|---|---|---|
| 1 | 0.95 | MEA-Pt | 2 h | <0.05 | <0.05 | <0.05 | >99.95 | >99.95 | >99.95 |
| 1 | 0.95 | MEA-Pt | 24 h | <0.05 | <0.05 | <0.05 | >99.95 | >99.95 | >99.95 |
| 1 | 0.95 | MEA-Pt | 7 d | <0.05 | <0.05 | <0.05 | >99.95 | >99.95 | >99.95 |
| 2 | 0.95 | MEA-Pt | 2 h | <0.05 | <0.05 | <0.05 | >99.95 | >99.95 | >99.95 |
| 2 | 0.95 | MEA-Pt | 24 h | <0.05 | <0.05 | <0.05 | >99.95 | >99.95 | >99.95 |
| 2 | 0.95 | MEA-Pt | 7 d | <0.05 | <0.05 | <0.05 | >99.95 | >99.95 | >99.95 |
| 3 | 0.95 | MEA-Pt | 2 h | 0.15 | 0.57 | 31.47 | 99.85 | 99.43 | 68.53 |
| 3 | 0.95 | MEA-Pt | 24 h | 0.15 | 0.43 | 37.52 | 99.85 | 99.57 | 62.48 |
| 3 | 0.95 | MEA-Pt | 7 d | 0.17 | 0.30 | 32.97 | 99.83 | 99.70 | 67.03 |
| 4 | 0.95 | EA-Pt | 2 h | 0.37 | 0.25 | 22.54 | 99.63 | 99.75 | 77.46 |
| 4 | 0.95 | EA-Pt | 24 h | 0.36 | 0.37 | 33.57 | 99.64 | 99.63 | 66.43 |
| 4 | 0.95 | EA-Pt | 7 d | 0.39 | 0.28 | 39.31 | 99.61 | 99.72 | 60.69 |

APPLICATION EXAMPLE 1

The catalytic activity of the exhaust gas treatment catalysts in the previous examples was measured in a synthesis gas unit. Using this unit it is possible to simulate almost all the gaseous exhaust gas components present in real exhaust gases from a diesel or gasoline engine. The test conditions chosen and the model gas composition are listed in Table 4. The following were used as hydrocarbon components: n-hexadecane, trivial name cetane, which is recognized as a reference substance for determining the ignition performance of diesel fuels. This long-chain, aliphatic compound is also found in real diesel exhaust gas.

The conversions of carbon monoxide and hydrocarbons under permanent operation at exhaust gas temperatures of 140° C. were measured in the synthesis gas unit. Measurements were performed both on fresh and also on aged catalysts (oven ageing: 16 hours at 750° C. in air+10 vol. % H$_2$O+20 ppm SO$_2$).

To determine the light-off temperatures, the exhaust gas was heated at a rate of heating of 15° C./min starting from 75° C.

Determining the conversion of nitrogen oxides was performed at the exhaust gas temperature T$_{NOX,max}$, at which the nitric oxide conversion had a maximum. These temperatures are given in brackets in Tables 6 and 7 after the relevant experimental values.

The following formula was used to calculate the rates of conversion:

$$X = \frac{N_E - N_A}{N_E} \cdot 100\%$$

X=rate of conversion [%]
N$_E$=concentration of harmful substances upstream of the catalyst (vppm)
N$_A$=concentration of harmful substances downstream of the catalyst (vppm).

The results of the measurements are given in Table 6 for fresh catalysts and in Table 7 for aged catalysts.

TABLE 6

Conversion of harmful substances by catalysts from examples E1–E7 and C1–C2 in the fresh state

| Example | T$_{50\%}$ [° C.] CO | T$_{50\%}$ [° C.] HC | Conversion at 140° C. [%] CO | Conversion at 140° C. [%] HC | NOx conversion at T$_{NOx,max}$ (in brackets) [%] NOx |
|---|---|---|---|---|---|
| C1 | 153 | <75 | 21 | 79 | 45 (220° C.) |
| C2 | 182 | <75 | 8 | 77 | 44 (234° C.) |
| E1 | 150 | <75 | 34 | 83 | 41 (210° C.) |
| E2 | 135 | <75 | 85 | 85 | 59 (182° C.) |
| E3 | 136 | <75 | 84 | 84 | 57 (181° C.) |
| E4 | 135 | <75 | 86 | 85 | 58 (181° C.) |
| E5 | 139 | <75 | 52 | 81 | 55 (185° C.) |
| E6 | 147 | <75 | 36 | 82 | 44 (190° C.) |
| E7 | 144 | <75 | 39 | 83 | 49 (188° C.) |

TABLE 7

Conversion of harmful substances by catalysts from selected examples after oven-ageing (16 h, 750° C., air + 10 vol. % H$_2$O + 20 ppm SO$_2$)

| Example | T$_{50\%}$ [° C.] CO | T$_{50\%}$ [° C.] HC | Conversion at 140° C. [%] CO | Conversion at 140° C. [%] HC | NOx conversion at T$_{NOx,max}$ (in brackets) [%] NOx |
|---|---|---|---|---|---|
| C2 | 234 | 250 | 3 | 40 | 35 (255° C.) |
| E1 | 202 | <75 | 12 | 75 | 45 (210° C.) |
| E2 | 191 | <75 | 15 | 77 | 53 (198° C.) |
| E3 | 190 | <75 | 11 | 78 | 49 (197° C.) |
| E4 | 191 | <75 | 11 | 77 | 50 (197° C.) |
| E5 | 198 | <75 | 12 | 74 | 49 (202° C.) |
| E6 | 196 | <75 | 11 | 77 | 48 (201° C.) |
| E7 | 197 | <75 | 10 | 78 | 51 (200° C.) |

Further various and modifications of the foregoing will be apparent to those skilled in the art and are intended to be encompassed by the claims appended hereto.

German priority application 197 53 738.3 is relied on and incorporated herein by reference.

We claim:

1. A process for producing a catalyst having a catalytically active coating comprised of high surface area, finely divided materials and catalytically active components on a carrier structure, the process comprising:
   a) impregnating at least one finely divided material with a solution of at least one precursor compound of at least one catalytically active component by pore volume impregnation, wherein at least one of the finely divided materials has an iso-electric point of from 6 to 10, wherein at least one of the precursor compounds of the at least one catalytically active component is an anionic salt of a platinum g roup metal, and wherein the volume of solution for pore volume impregnation is from 40 to 90% of a water absorption capacity of the finely divided material;
   b) producing an aqueous coating dispersion having a pH value which is 1 to 3 points below the iso-electric point of 6 to 10, by dispersing the impregnated powder mixture in an aqueous medium;
   c) coating the carrier structure with the aqueous coating dispersion; and
   d) drying and calcining 2 the coating.

2. The process according to claim 1, wherein the at least one finely divided material comprises at least one member selected from the group consisting of aluminum oxide, cerium oxide, zirconium oxide, titanium oxide and mixtures of these materials with silicon dioxide.

3. The precess according to claim 2, wherein the at least one anionic salt of a platinum group metal comprises at least one of chlorides and anionic salts complexed with alkanolamines.

4. The process according to claim 3, wherein the at least one finely divided material further comprises at least one zeolite with a molar ratio of silicon dioxide to aluminum oxide greater than 50.

5. A process for producing a catalyst having a catalytically active coating comprised of high surface area, finely divided materials and catalytically active components on a carrier structure, the process comprising:
   a) impregnating at least one finely divided material with a solution of at least one precursor compound of at least one catalytically active component by pore volume impregnation, wherein at least one of the finely divided materials has an iso-electric point of from 6 to 10, wherein at least one of the precursor compounds of the at least one catalytically active component is an anionic salt of a platinum group metal, and wherein the volume of solution for pore volume impregnation is from 50 to 70% of a water absorption capacity of the finely divided material;
   b) producing an aqueous coating dispersion having a pH value which is 1 to 3 points below the iso-electric point of 6 to 10, by dispersing the impregnated powder mixture in an aqueous medium;
   c) coating the carrier structure with the aqueous coating dispersion; and
   d) drying and calcining the coating.

6. A process for producing a catalyst having a catalytically active coating comprised of high surface area, finely divided materials and catalytically active components on a carrier structure, the process comprising:
   a) impregnating at least one finely divided material selected from the group consisting of aluminum oxide, cerium oxide, zirconium oxide, titanium oxide and mixtures of these materials with silicon dioxide, with a solution of at least one precursor compound of at least one catalytically active component by pore volume impregnation, wherein at least one of the finely divided materials has an iso-electric point of from 6 to 10, wherein the at least one finely divided material further comprises at least one zeolite with a molar ratio of silicon dioxide to aluminum oxide greater than 50, and wherein at least one of the precursor compounds of the at least one catalytically active component is an anionic salt of a platinum group metal comprising at least one of chlorides and anionic salts complexed with alkanolamines;

b) producing an aqueous coating dispersion by dispersing the impregnated powder mixture in an aqueous medium;

c) coating the carrier structure with the aqueous coating dispersion; and d) drying and calcining the coating, wherein a final coating on the support structure is reduced at a temperature above 300° C. in a hydrogen-containing gas stream.

7. A process for preparing a catalyst having a catalytically active coating comprised of high surface area, finely divided materials and catalytically active components on an inert carrier structure, the process comprising:

a) impregnating at least one finely divided material with a solution of at least one precursor compound of at least one catalytically active component by pore volume impregnation, wherein at least one of the at least one finely divided material has an iso-electric point between 2 and 7, wherein the at least one precursor compound of the at least one catalytically active component is a cationic salt of a platinum group metal, and wherein the at least one catalytically active component is thermally fixed onto the finely divided material after the pore volume impregnation;

b) dispersing the impregnated powder mixture in an aqueous medium to form an aqueous coating dispersion;

c) coating the carrier structure with the aqueous coating dispersion; and d) drying and calcining the coating.

8. The process according to claim 7, wherein the at least one finely divided material comprises at least one member selected from the group consisting of titanium oxide, cerium oxide, zirconium oxide, and mixtures of these materials with silicon dioxide.

9. The process according to claim 8, wherein the cationic salt of a platinum group metal comprises tetraammine complexes, nitrates or mixtures thereof as cationic complexes.

10. A process for preparing a catalyst having a catalytically active coating comprised of high surface area finely divided materials and catalytically active components on an inert carrier structure, the process comprising:

a) impregnating at least one finely divided material with a solution of at least one precursor compound of at least one catalytically active component by pore volume impregnation, wherein at least one of the at least one finely divided material has an iso-electric point between 2 and 7, and wherein the at least one precursor compound of the at least one catalytically active component is a cationic salt of a platinum group metal;

b) dispersing the impregnated powder mixture in an aqueous medium to form an aqueous coating dispersion having a pH value which is 1 to 5 units above the iso-electric point of 2 to 7;

c) coating the carrier structure with the aqueous coating dispersion; and d) drying and calcining the coating.

11. A process for preparing a catalyst having a catalytically active coating comprised of high surface area, finely divided materials and catalytically active components on an inert carrier structure, the process comprising:

a) impregnating at least one finely divided material with a solution of at least one precursor compound of at least one catalytically active component by pore volume impregnation. wherein at least one of the at least one finely divided material has an iso-electric point between 2 and 7, and wherein the at least one precursor compound of the at least one catalytically active component is a cationic salt of a platinum group metal:

b) dispersing the impregnated powder mixture in an aqueous medium to form an aqueous coating dispersion having a pH value from 7 to 9;

c) coating the carrier structure with the aqueous coating dispersion; and d) drying and calcining the coating.

12. A process for preparing a catalyst having a catalytically active coating comprised of high surface area, finely divided materials and catalytically active components on an inert carrier structure, the process comprising:

a) impregnating at least one finely divided material with a solution of at least one precursor compound of at least one catalytically active component by pore volume impregnation, wherein at least one of the at least one finely divided material has an iso-electric point between 2 and 7, wherein the volume of solution for pore volume impregnation is from 40 to 90% of a water absorption capacity of the finely divided material, and wherein the at least one precursor compound of the at least one catalytically active component is a cationic salt of a platinum group metal;

b) dispersing the impregnated powder mixture in an aqueous medium to form an aqueous coating dispersion having a pH value which is 1 to 5 units above the iso-electric point of 2 to 7;

c) coating the carrier structure with the aqueous coating dispersion; and d) drying and calcining 2 the coating.

13. A process for preparing a catalyst having a catalytically active coating comprised of high surface area, finely divided materials and catalytically active components on an inert carrier structure, the process comprising:

a) impregnating at least one finely divided material with a solution of at least one precursor compound of at least one catalytically active component by pore volume impregnation, wherein at least one of the at least one finely divided material has an iso-electric point between 2 and 7, wherein the volume of solution for pore volume impregnation is from 50 to 70% of a water absorption capacity of the finely divided material, and wherein the at least one precursor compound of the at least one catalytically active component is a cationic salt of a platinum group metal;

b) dispersing the impregnated powder mixture in an aqueous medium to form an aqueous coating dispersion having a pH value which is 1 to 5 units above the iso-electric point of 2 to 7;

c) coating the carrier structure with the aqueous coating dispersion; and d) drying and calcining the coating.

* * * * *